United States Patent [19]

Smith et al.

[11] 3,737,190
[45] June 5, 1973

[54] CAMPER UNIT

[76] Inventors: Robert W. Smith, 2041 Carolina Avenue, Port Arthur, Tex. 77640; William H. Smith, 303 Hill Terrace Drive; Roy E. Neel, 704 22nd Street, both of Nederla, Tex. 77627

[22] Filed: June 25, 1971

[21] Appl. No.: 156,860

[52] U.S. Cl. .................. 296/23 A, 135/1 A
[51] Int. Cl. ........................... B60p 3/34
[58] Field of Search .............. 296/23 R, 23 A; 135/1 A, 3 A, 4 A, 5 A

[56] References Cited

UNITED STATES PATENTS 3,466,082    9/1969    Branch ........................ 296/23

*Primary Examiner*—Philip Goodman
*Attorney*—Pravel, Wilson & Matthews

[57] ABSTRACT

A camper unit is sufficiently light and compact that it may be easily carried on a vehicle such as a pick up truck, and may be erected on the ground or in the pick up truck itself.

17 Claims, 8 Drawing Figures

Robert W. Smith
Roy E. Neel
William H. Smith
INVENTORS

BY

Pravel Wilson & Matthews
ATTORNEYS

Robert W. Smith
Roy E. Neel
William H. Smith
INVENTORS

BY

Pravel Wilson & Matthews
ATTORNEYS

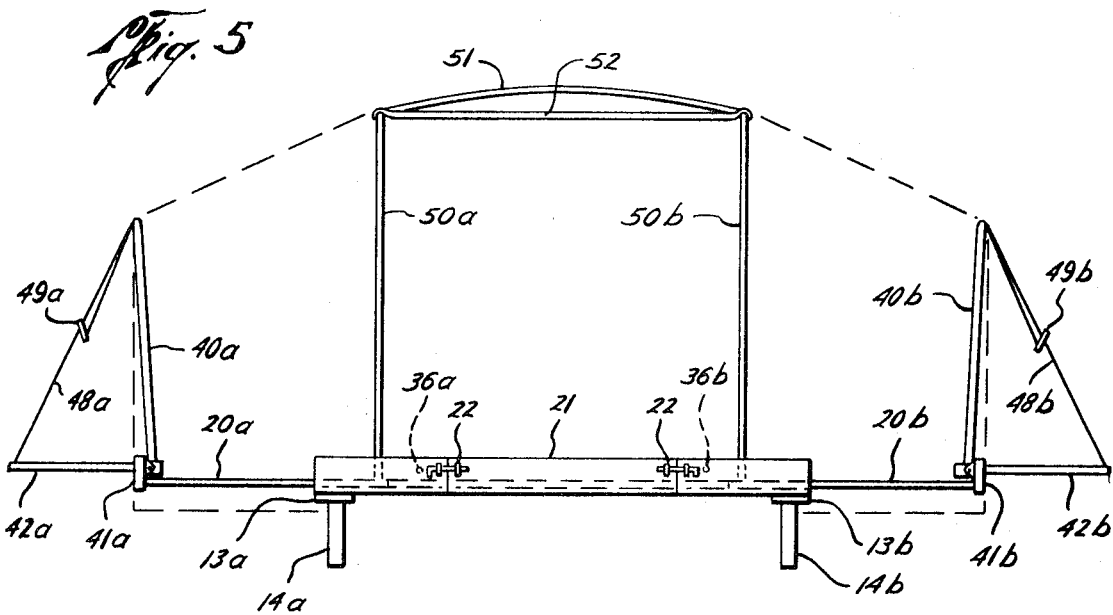
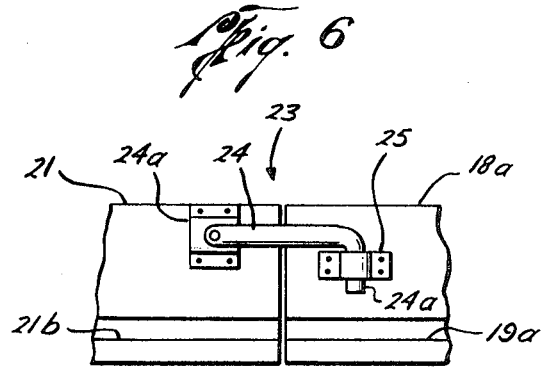
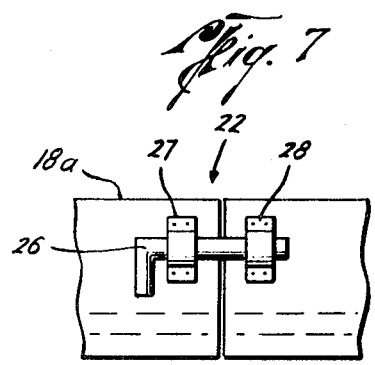
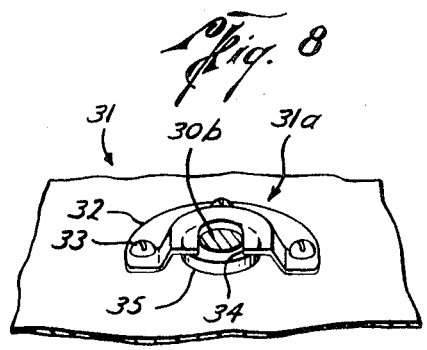

CAMPER UNIT

BACKGROUND OF THE INVENTION

The field of the invention is camping equipment.

Tents used for camping out of doors must not only provide a good cover when in an erected position; but, such tents must be light weight for ease in handling and collapsible into compact units for ease in carrying.

One style of camper unit is collapsible into a trailer so that the camper unit may be towed from place to place by automobile. Another style of camper, which is shown in the U.S. Pat. No. 3,466,082 issued to Branch, is mounted in the load carrying bed of a pick up truck and is erected therein. Camper units such as that disclosed in the Branch patent offer the advantage of being movable with the pick up truck; however they are very heavy and bulky and have such a unusual shape that they cannot be carried in any vehicle but a pick up truck. Although the erecting of a camper unit on the pick up truck offers the advantage of providing sleeping space removed from the ground, it is sometimes desirable, such as when the camping grounds are cleared, to remove and erect the camper unit away from the pick up truck so that the pick up truck can be used for other purposes. The camper unit of Branch cannot be easily removed and erected away from the pick up truck. Further, in order for the camper unit in Branch, U.S. Pat. No. 3,466,082 to be mounted in a pick up truck, a number of rather heavy mounting brackets must be attached to the lower rear fenders.

SUMMARY OF THE INVENTION

It is an object of this invention to provide a camper unit that is sufficiently light and compact that it may be carried by many types of vehicles, including a pick up truck, and may be erected either in the vehicle or on the ground or other surface.

This object and other objects of this invention are accomplished by providing a camper unit that is adapted to be mounted into numerous types of vehicles such as a pick up truck for carrying and may be erected in the pick up truck or at other locations. The camper according to this invention includes panels which are supported in a cantilever position extending outwardly beyond the camper frame so that additional sleeping and storage space is provided. In one particular aspect of this invention, reinforcing means are disposed between opposing side portions of the frame for supporting the panels in the cantilever position.

BRIEF DESCRIPTION OF THE DRAWING

The preferred embodiment of this invention will be described hereinafter; together with other features thereof, and additional objects will become evident from such description.

The invention will be more readily understood from a reading of the following specification and by reference to the accompanying drawings forming a part thereof wherein an example of the invention is shown and wherein:

FIG. 5 is an end view of the camper unit of this invention with the tent-like cover removed from the pick up truck;

FIG. 6 is a detailed view of the inside frame latch taken along line 6—6 of FIG. 4;

FIG. 7 is a detailed view of the outside frame latch taken along line 7—7 of FIG. 4; and FIG. 8 is a sectional view of the anchoring means taken along line 8—8 of FIG. 1.

Figure 1:
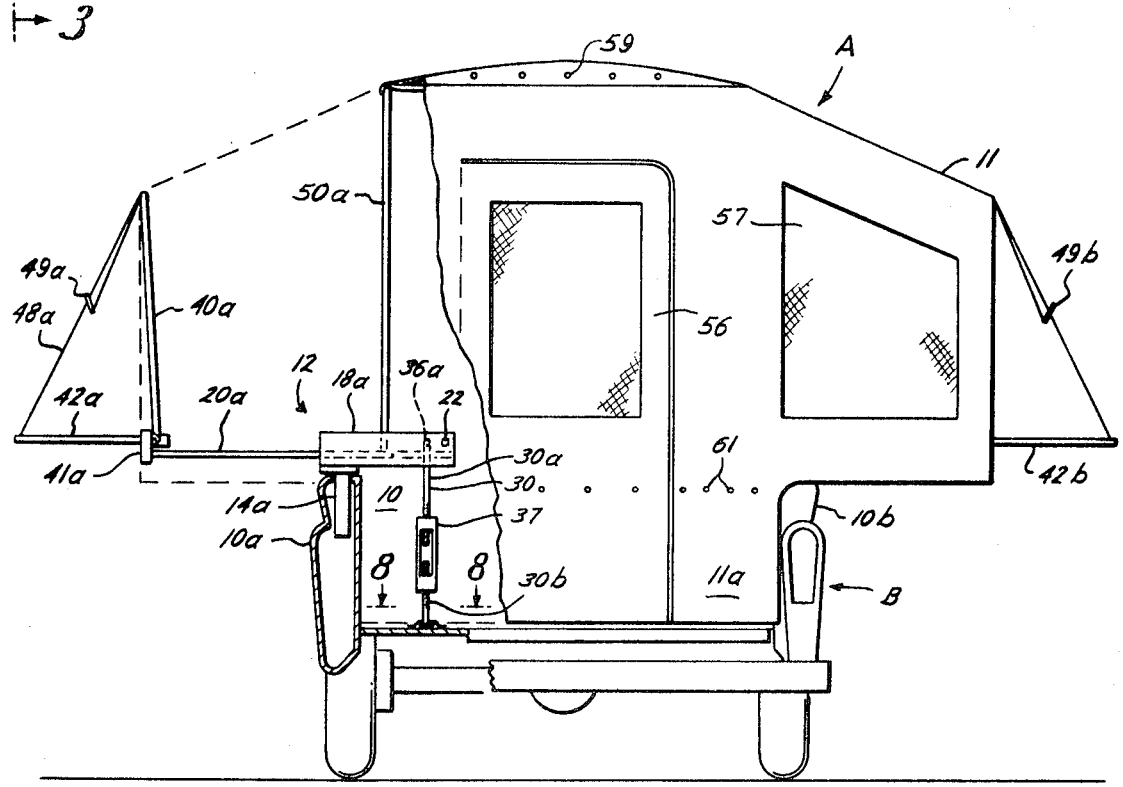
FIG. 1 is an end view of the camper unit of this invention in an erected position.

In the drawings, the camping unit A is shown mounted on a pickup truck B which has a load carrying bed generally designated by the number 10. The load carrying bed 10 includes upstanding sidewalls 10a and 10b which extend upwardly from a floor 10c. In accordance with a preferred embodiment of this invention, the camping unit A is mounted on the upstanding sidewalls 10a and 10b of the load carrying bed 10 of the pick up truck. The camping unit A is extremely light weight and, as will be described later, is collapsible into the compact position shown in FIG. 2 and may be unfolded or erected to the position shown in FIGS. 1, 3 and 5. A tent-like cover 11 is designed to provide a cover for the camper unit when erected; the cover 11 is shown partly removed in FIG. 3 and in broken lines in FIG. 3 and FIG. 5.

The camping unit A comprises a U-shaped frame 12 which includes opposing side portions 12a and 12b which are mounted on the upstanding sidewalls 10a and 10b respectively, of the load carrying bed. The opposing side portions of the frame include flat side boards 13a and 13b. The side board 13a has studs 14a and 15a extending from the bottom surface of the board member in position to fit into support holes in the upstanding sidewall 10a. Similarly, the side boards 13b has studs, only stud 14b being shown in the drawing, which are positioned so that the side board can be mounted onto the top of the upstanding sidewall 10b of the load carrying bed of the pick up. The side boards 13a and 13b are connected at their front ends by a front board 16 by any suitable means such as brackets (not shown) so that the side boards 13a and 13b and the front board 16 form the U-shaped frame 12.

Figure 2:
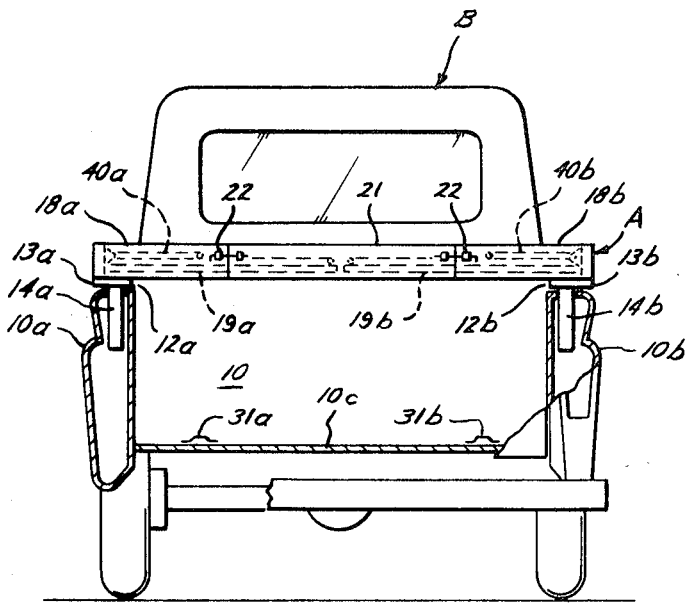
FIG. 2 is an end view of the camper unit in a collapsed position.
Figure 3:
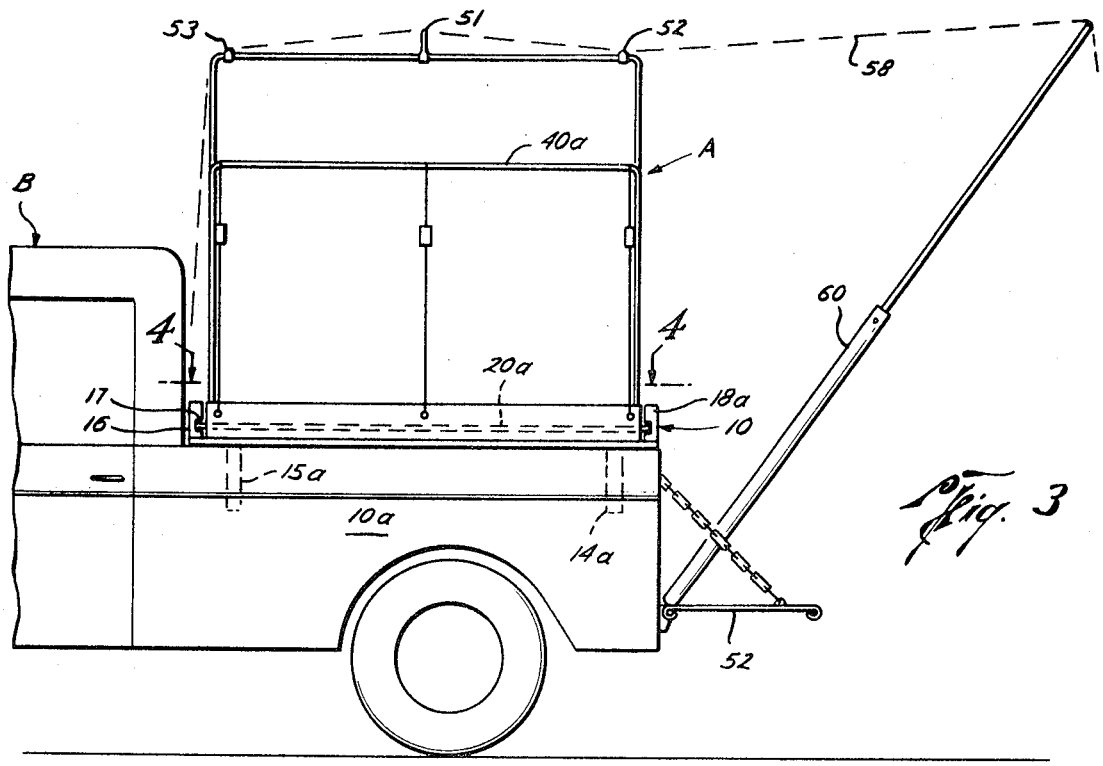
FIG. 3 is a side view taken along line 3—3 of FIG. 1.
Figure 4:
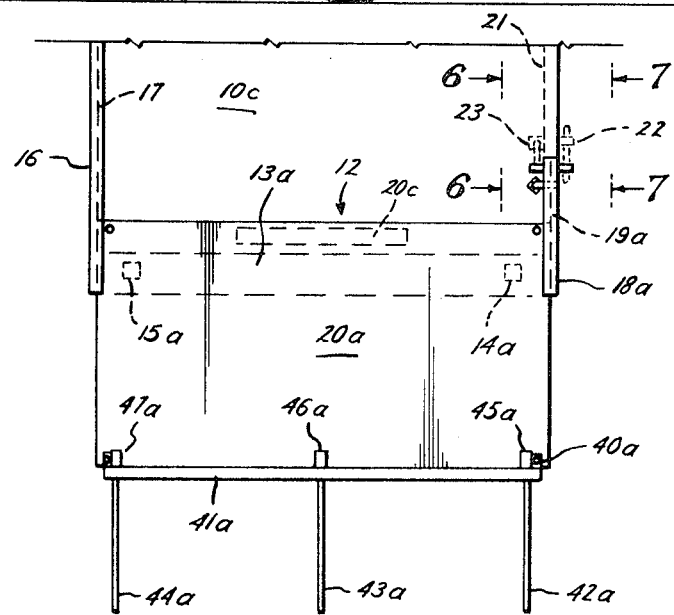
FIG. 4 is a sectional view taken along 4—4 of FIG. 3 showing one of the panels in the cantilever position.

The front member 16 has a groove 17 disposed therein. A panel supporting member 18a is connected to the top surface of the side board 13a and extends therefrom in a horizontal direction as shown in FIG. 2. Similarly, a panel supporting member 18b is connected to the side board 13b and extends in a horizontal direction therefrom. Both panel supporting members 13a and 13b extend inwardly toward each other and do not extend over the outside of the upstanding sidewalls 10a and 10b of the load carrying bed of the pick up truck. These panel supporting members 18a and 18b also have grooves 19a and 19b disposed therein, respectively. In this manner, the front board 16 with its groove 17 disposed therein cooperates with the panel supporting member 18a to form a set of panel supporting members which support a panel 20a. The panel 20a is mounted in the groove in front connecting member 16 and panel supporting member 18a for slidable movement in a substantially horizontal direction between a collapsed position (shown in broken lines in FIG. 2) where the panel 20a is positioned substantially between the side members 13a and 13b and a cantilever position where the panel 20a extends outwardly beyond the side board 13a over the upstanding side wall 10a of the pick up (shown in FIGS. 1, 4 and 5). In a similar manner a panel 20b (which is shown in FIG. 5) is mounted for slidable movement in the set of panel supporting members, which is provided by the panel supporting member 18b and the groove 19b disposed therein, in cooperation with the front board 16 and the groove 17 disposed therein.

A reinforcing means includes a center support member 21 connected to the platform supporting members 18a and 18b by means of outside latch means 22 and inside latch means 23 in order to prevent the panel support members 18a and 18b from horizontal or vertical movement with respect to each other. By securing the panel support members in this manner the panels 20a and 20b, and the frame 12 itself, are reinforced in both the collapsed and the cantilevered positions whereby the panels may provide a storage or sleeping area extending outwardly of the load carrying bed of the truck. A groove 21b in the center support member is aligned with the grooves 19a and 19b in panel support member 18a and 18b, respectively, to support the panels 20a and 20b in the collapsed position.

The inside latch means 23, shown in detail in FIG. 6, secures the center support member 21 and the panel support member 18a against horizontal movement with respect to each other. The inside latching means 23 includes an L-shaped arm 24 which is attached to the center support member 21 by a bracket 24a such that the bar has a vertically extending portion 24 which fits into a substantially U-shaped bracket 25 secured to panel support member 18a. The outside latch means 22, which is shown in detail at FIG. 7, is designed to prevent relative vertical movement between the center support member 21 and the panel supporting members such as 18a. The outside latch means 22 may simply consist of a sliding bolt type latch where a sliding bolt 26 extends through the substantially U-shaped bracket 27 mounted on panel support member 18a and U-shaped bracket 28 mounted on center support member 21. Of course, similar inside and outside latching means are provided between the center support member 21 and the panel supporting member 18b.

The center support member 21, when secured to the panel support members 18a and 18b, provides support for the entire camper frame 12 when the camper unit is in the collapsed position shown in FIG. 2. The center support member can also support the panels 20a and 20b in the cantilever position when the camper unit is erected away from the pick up truck. However, when the camping unit is erected on the pick up truck, the center support member 21 would interfere with the entrance into the load carrying bed 10 on the pick up truck. In order to provide for the removal of this center support member when the tent is erected on the pick up truck, the reinforcing means of this invention further includes an adjustable tie rod 30 which may be connected to the panel supporting member 18a and to the floor 10c of the load carrying bed of the pick up truck in order to support in tension the panel 20a, and any weight placed thereon, thereby allowing the inside latch means 23 and the outside latch means 22 to be released so that the center support member can be removed.

In order to connect the tie rod 30 to the floor 10c of the load carrying bed of the pick up truck, an anchoring means 31 is mounted on the floor. Referring to FIG. 8, the anchoring means 31 is simply a plate 32 which is mounted by screws 33 to the floor 10c. The plate 32 has a raised portion 31a with a slot 34 adapted to receive a collar 35, which may simply be a bolt head, disposed on the lower end of the tie rod 30. The top portion of the tie rod is L-shaped (not shown) so that the horizontal portion of the tie rod may be inserted into a hold 36a in the panel supporting member 18a. The tie rod 30 may be adjustable by any suitable means such as a threaded sleeve 37 which is threadedly connected to the upper tie rod portion 30a and the lower tie rod portion 30b. Similarly, the panel support member 18b may be secured to an anchoring means 31b by a tie rod (not shown) of the same construction as the tie rod 30 with the tie rod fitting in hole 36b in panel support member 19a.

The tent-like cover 11 is supported over the frame 12 by a series of supports which are attached to the frame 12 or the panels 20a and 20b. In order to support the tent-like cover 11 in an erected position, a first U-shaped cover supporting member 40a is pivotally mounted to an end piece 41a connected to the panel 20a. A first cover supporting member 40b is similarly pivotally mounted to an end piece 41b attached to the panel 20b. In order to support the tent-like cover 11 in an erected position, a first U-shaped cover supporting member 40a is pivotally mounted to an end piece 41a connected to the panel 20a. The first cover supporting members 40a and 40b are pivotal between the collapsed position shown in FIG. 2 and the substantially upright position shown in FIGS. 1, 3 and 5 where the members support the tent-like cover 11 in an erect position.

A plurality of outrigger arms 42a, 43a and 44a are mounted in sleeves 45a, 46a and 47a extending through the paneled end pieces 41a. A rope line such as 48a is attached to each of the outrigger arms and to the first cover supporting member 40a so that the outrigger arms will serve to maintain the first cover supporting member 40a, which is attached to the tent-like cover 11, in a substantially upright position even under the weight of the tent-like cover 11 in its erected position. Similarly, a plurality of outrigger arms such as 42b are attached to the end piece 41b for panel 20b and extend in a horizontal direction and are connected to the first cover supporting member 40b by a rope line 48a in order to support and maintain the first cover supporting member 40b in a substantially upright position under the weight of the attached, erected or unfolded tent-like cover 11. The tautness of the lines 48a and 48b may be adjusted by adjustable means such as the sliding knots 49a and 49b.

In order to support the center part of the tent-like cover 11, second vertically extending U-shaped cover supporting members 50a and 50b may be mounted in holes (not shown) in the panels 20a and 20b, respectively. A bowed brace member 51 and straight brace members 52 and 53 are attached to the second vertically extending cover supporting members 50a and 50b thereby providing support for the tent-like cover. The bowed brace 51 provides an apex for the tent-like cover in order to enhance drainage.

When the camping unit is in the collapsed position shown in FIG. 2, the first cover supporting members 40a and 40b are pivoted to a almost horizontal position where they are substantially flat against the panels 20a and 20b, respectively. The panels themselves are positioned within the grooves in the front board 16, in the platform supporting members 18a and 18b, and in the center supporting member 21. With the panels in this collapsed position, they are disposed entirely between the side board members 13a and 13b thereby providing a very compact camping unit which may easily be handled and stored either in the position on the pick up truck shown in FIG. 2 or at some other location. The center support member 21 secures the U-shaped frame so that it may be easily moved. When the camping unit is in the collapsed position shown in FIG. 2, an outside cover (not shown) may be mounted over the frame in order to protect the camping unit.

When it becomes necessary to erect the camping unit, the outside cover is removed and, of course, the tail gate 52 of the pick up truck is lowered. The first cover support members 40a and 40b are then raised to a substantially vertical position and the outriggers such as 42a and 42b are inserted into the sleeves such as 45a in respected end pieces 41a and 41b. Now, the panels 20a and 20b are slidably moved from their collapsed position to a substantially cantilevered position where the panels extend outwardly over the upstanding side walls 10a and 10b of the pick up truck; however, the panels at this time are not moved entirely to the full extended position shown in FIG. 4. The tie-rod 30 is now connected between the panel support member 18a and the plate 32 mounted on the floor 10c of the pick up truck bed. After the tie rod 30 has been inserted into the hole 36a in the panel supporting member 18a and into the slot 34 in the plate 32, the adjusting sleeve 37 may be turned until the tie rod 30 will resist any movement of the platform support member 18a. In a similar manner a tie rod (not shown) is attached between the anchoring means 31b in the floor of the pick up and the panel support member 18b. The center support member 21 may now be removed by simply releasing the inside and outside latch means. The second cover supporting members 50a and 50b are now inserted into holes (not shown) in the panels 20a and 20b respectively and the cross braces 51, 52 and 53 are attached therebetween. The panels 20a and 20b are now slidably moved to the extended cantileve position shown in FIGS. 4 and 5 and the rope lines such as 48a are adjusted by the sliding knots 49a and 49b until they are extremely taut so that the first cover supporting members 40a and 40b are maintained in a substantially upright position whereby the tent-like cover 11 is stretched firmly over the cover supporting members. It is noted that bed stops such as 20c may be mounted on the upper surface of the panels 20a and 20b (see FIG. 4) in order to maintain the bed mattress in position.

The tent like cover 11 may be of any suitable design in that it may include a zipper door 56 and screen windows such as 57. The tent-like cover may be attached to the frame by a means of snaps (not shown). The outside cover which extends over and protects the entire camping unit in its collapsed position shown in FIG. 2, may be used as a canopy 58 in the position shown in FIG. 3 where it may be connected to snaps 59 and held in an upright extended position by telescoping poles such as 60 attached to the load carrying bed of the truck and to the outside cover, itself.

The camper unit A is of extreme light weight and therefore may be mounted on a vehicle such as a pick up truck or other vehicles, perhaps with the studs such as 14a and 15a extending from the side boards 13a and 13b removed. The camping unit A offers the further advantage that, when adapted to be mounted in a pick up truck, the only necessary adaptation to the truck itself is the mounting of the plates 32 to the floor 10c of the load carrying bed of the truck. The tie rods provide substantial reinforcement for the panels 20a and 20b in their extended cantilever position so that even two people may sleep at a time on top of one of the panels. Therefore, the camping unit A may sleep up to four in both panels 20a and 20b which allows the floor 10c of the pick up truck bed to remain substantially free of obstruction so that even more campers may sleep on the floor.

It is to be understood that it is within the scope of this invention that the camping unit A be adapted to be erected on the ground or other surfaces separate and apart from any type of vehicle including a pick up truck. For instance, by the very simple step of removing the studs such as 14a and 15a from the bottom of the side boards 13a and 13b, the camping unit may be placed upon any surface such as the ground. When the camper unit is erected on the ground, the frame 12 is reinforced by the center support 21 which is very close to the ground itself and will not obstruct entry into the camper unit. Of course, if the camper unit is used off of the pick up truck, the lower portion 11a of the cover 11 may be removed by unsnapping it at snaps 61. Therefore, this camping unit may be carried on many different types of vehicles and may be used to provide covered camping space in the bed of the pick up truck or at other locations such as on the ground itself.

The foregoing disclosure and description of the invention are illustrative and explanatory thereof, and various changes in the size, shape, and materials as well as in the details of the illustrated construction may be made without departing from the spirit of the invention.

We claim:

1. A camping unit which may be collapsed into a compact unit and is easily erected, comprising:
   a. a frame including opposing side portions;
   b. a panel mounted on each of said opposing side portions for movement between a collapsed position where said panels are positioned substantially between said opposite side portions and a cantilever position where said panels extend outwardly beyond said opposing side portions; and
   c. means including a removable member for connecting said opposing side portions of said frame for reinforcing said frame for supporting said panels in said cantilever position wherein said panels can provide a storage or sleeping area extending beyond the frame.

2. The structure set forth in claim 1, including:
   a. a tent-like cover; and
   b. cover supporting means attached to and extending from said panels and from said frame for supporting said tent-like cover in an erected position.

3. The structure set forth in claim 1 including:
   a. said frame including panel supporting members attached to each of said opposite side portions and extending from said opposite side portions of said frame in a substantially horizontal direction, each panel supporting member having a groove disposed therein; and
   b. each of said panels is slidably mounted in said grooves in said panel supporting members for movement in a substantially horizontal direction whereby said panels provide a substantially horizontal surface area for storage or sleeping.

4. The structure set forth in claim 1 wherein: said removable member connecting said opposing side portions in order to provide support for said panels in the cantilever position.

5. The structure set forth in claim 1 wherein one of said panel support members is attached at one end to one of said opposing side portions is also attached at the other end to said other opposing side portion in order to provide an integral substantially U-shaped frame.

6. The structure set forth in claim 2 wherein said cover supporting means includes:
a first cover supporting member pivotally mounted to each of said panels whereby said cover supporting members may be pivoted to substantially upright positions in order to support said cover in an erect position.

7. The structure set forth in claim 4 wherein said removable member provides support for the frame when the panels are in a collapsed position.

8. The structure set forth in claim 6 including:
a. said first cover supporting members are attached to said tent-like cover; and
b. said outrigger means extends outwardly from each panel and connects to said first cover supporting member for maintaining said tent-like cover in an erect position.

9. The structure set forth in claim 6 including:
a. second vertically extending cover supporting members mounted on each of said panels to support said cover; and
b. cross cover supporting member attached to said second vertically extending members in order to further support said cover in an erect position.

10. The structure set forth in claim 6 wherein said first cover supporting members are pivotal to a collapsed substantially horizontal position against the panels so that said camper unit forms a compact unit when not erected.

11. The structure set forth in claim 1, including:
a. said frame is adapted for mounting on opposing upstanding side walls of a load carrying bed of a vehicle such as a pick up truck whereby said panels in the cantilever position extend outwardly from said upstanding side walls;
b. anchoring means are mounted on the floor of the vehicle load carrying bed; and
c. means for connecting said frame to said anchoring means.

12. The structure set forth in claim 11 wherein said means for connecting are adjustable tie rods connected to said frame and to the floor of the load carrying bed of the vehicle.

13. The combination of a vehicle such as a pick up truck having a load carrying bed defined by upstanding side walls and a floor and a camper unit mounted on said vehicle capable of providing a covered storage or sleeping space extending beyond the opposing upstanding sides of the vehicle load carrying bed, comprising:
a. a frame including opposing side portions mounted on each of the opposing upstanding side walls of the load carrying bed and a set of panel supporting members attached to each of said opposite side portions;
b. a panel mounted on each set of said panel supporting members for slidable movement between a collapsed position where said panels are positioned substantially inside the opposing upstanding side walls of the load bed and a cantilever position where said panels extend outwardly of the load carrying bed over the opposing upstanding side walls; and
c. means including a removable member for connecting said opposing side portions of said frame for reinforcing said frame for supporting said panels in said cantilever position whereby said panels provide a storage or sleeping area extending outwardly of the load carrying bed of the truck.

14. The structure set forth in claim 13, including:
a. a tent-like cover; and
b. cover supporting means attached to and extending from said panels and from said frame for supporting said cover in an erected position.

15. The structure as set forth in claim 13 including:
said removal member connecting a panel support member mounted on one of said opposing side portions to a panel support member mounted on said other opposing side portion to support said camper unit.

16. The structure set forth in claim 13 including:
a. anchoring means mounted on the floor of the vehicle load carrying bed; and
b. means for connecting said frame and to said anchoring means.

17. The structure set forth in claim 13 wherein said reinforcing means is an adjustable tie rod connected to said frame and to said floor of said load carrying bed of said vehicle.

* * * * *